United States Patent [19]

Moore

[11] 4,240,763
[45] Dec. 23, 1980

[54] RESILIENT COUPLINGS

[75] Inventor: Alan F. Moore, Burbage, England

[73] Assignee: Dunlop Limited, London, England

[21] Appl. No.: 27,101

[22] Filed: Apr. 4, 1979

[30] Foreign Application Priority Data

Apr. 15, 1978 [GB] United Kingdom ............... 14886/78

[51] Int. Cl.³ .......................... E21B 19/16; F16D 1/00
[52] U.S. Cl. .................................... 403/203; 403/221;
403/225; 403/228; 64/27 NM
[58] Field of Search ............... 403/203, 225, 221, 226,
403/228, 364, 372; 64/27 NM

[56] References Cited

U.S. PATENT DOCUMENTS

| 3,320,771 | 5/1967 | Roethlisberger et al. ........ 64/27 NM |
| 3,386,264 | 6/1968 | Paulsen ............................ 64/27 NM |
| 3,878,695 | 4/1975 | Pitner ............................... 64/27 NM |

*Primary Examiner*—Wayne L. Shedd
*Attorney, Agent, or Firm*—Stevens, Davis, Miller & Mosher

[57] ABSTRACT

In a resilient coupling of the kind comprising an inner shaft nested concentrically within an outer shaft by means of a sleeve unit of elastomeric material for transmission of torque between the shafts there is provided a buffer unit mounted within the outer shaft to transit torque between the shafts only when a certain degree of torsional deflection is exceeded by the sleeve unit.

9 Claims, 14 Drawing Figures

RESILIENT COUPLINGS

This invention relates to a resilient coupling and in particular, though not exclusively, to a cardan shaft for use in a motor vehicle transmission. It also relates to a resilient coupling for the transmission of torque through only small angular movements.

Cardan shafts for the continuous transmission of a drive torque commonly comprise a pair of universal joints inter-connected by a tubular metal shaft. To minimize the transmission of vibration and shock loadings along the shaft it is the practice to form the shaft of two parts of different diameters so that the end of one shaft may be nested concentrically part way into the other with a sleeve of elastomeric material being provided between the shafts to maintain them in said concentric arrangement and also transmit torque therebetween.

To increase the torque transmission capability of the sleeve, the sleeve material may be highly compressed in a radial direction.

Difficulty is experienced, however, in providing a satisfactory transmission coupling design where there is a requirement for the coupling to have a relatively low torsional stiffness and relatively high torque transmitting capability compared with that of cardan shafts which have hitherto commonly been used. This difficulty is particularly notable in the case of vehicles intended to operate in high temperature environments which over a prolonged period of time can cause the rubber or other elastomeric material of the sleeve to reduce in stiffness with corresponding reduction in torque capacity.

In practice the difficulty is that if the sleeve is made thin and/or subject to a high degree of compression to improve its torque transmission capability the stiffness increases, while if the sleeve thickness is increased and/or the degree of compression reduced to give the desired relatively low torsional stiffness, the torque transmission capability is inadequate.

The problem can be overcome by increasing the diameters of the shafts and sleeves and/or numbers of sleeves but this is often not an acceptable solution since space available for a transmission shaft is often very limited.

According to one aspect of the present invention a resilient coupling comprises an inner shaft nested concentrically within an outer shaft by means of a sleeve unit of elastomeric material for transmission of torque between the shafts, and a buffer unit mounted within the outer shaft and arranged to transmit torque between the shafts only when a certain degree of torsional deflection is exceeded by the sleeve unit.

Thus the sleeve unit may be designed to be torsionally soft as desired for low torque transmission levels, and any undue strain or damage of said sleeve unit when subject to higher torque loadings is restrained by the relatively torsionally stiff buffer unit acting in parallel with the sleeve unit to transmit torque. The buffer unit thus selectively increases the stiffness of the transmissions coupling only when a certain degree of torsional deflection in the buffer unit is exceeded.

The buffer unit may comprise a female spider unit having a plurality of circumferentially spaced rigid arms and a male spider unit having a plurality of rigid arms extending radially outwardly into spaces between the rigid arms of the female spider unit. The arms of both spider units preferably have abutment surfaces which lie in planes extending in a direction substantially parallel to the axis of rotation of the coupling, and preferably resilient elements of rubber or other elastomeric material are provided between successive arms of the male and female spider units to transmit torque therebetween when the said certain degree of torsional deflection is exceeded. The resilient elements may be provided on the arms of either or both the male and female spider units. Preferably the rubber elements are mounted and positioned so as to fail safe, i.e. so that in the event of tearing, decomposition or other failure of said rubber element(s) there results a direct transmission of torque between the shafts at torque level causing more than the aforementioned certain degree of torsional deflection.

The invention also provides in accordance with another of its aspects a transmission shaft comprising the combination of a resilient coupling and one or more universal joints. There is further provided by the present invention a vehicle suspension having a resilient coupling which may interconnect between the vehicle body and an axle hub to transmit torque loadings in the suspension through relatively small angular movements.

A male or female part of a spider unit, or other part of a buffer unit, may be formed integral with a universal joint provided at one end of the transmission coupling.

Several embodiments of the invention will now be described, by way of example, with reference to the accompanying diagrammatic drawings in which.

Figure 1:
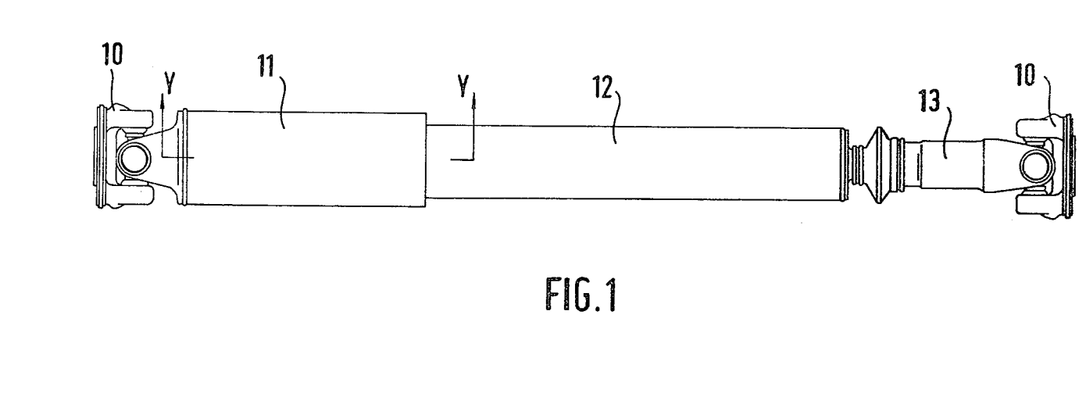
FIG. 1 shows in outline a transmission coupling assembly in accordance with the present invention.

Referring to FIG. 1, a cardan shaft assembly comprises two universal joints 10 interconnected by a composite shaft assembly comprising two tubular metal shafts 11, 12 and a splined shaft assembly 13 for accommodating small changes in the axial spacing between the two universal joints 10. The three shafts 11, 12, 13 are arranged in series for the transmission of torque between the universal joints.

Figure 2:
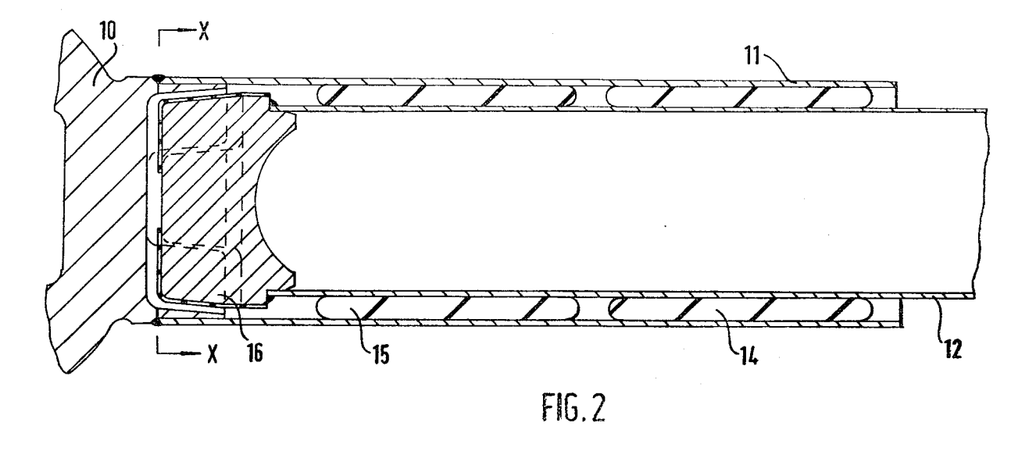
FIG. 2 is a section on the line Y—Y of FIG. 1.
Figure 3:
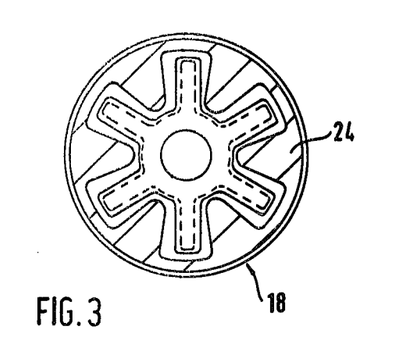
FIG. 3 is a section on the line X—X of FIG. 2.
Figure 4:
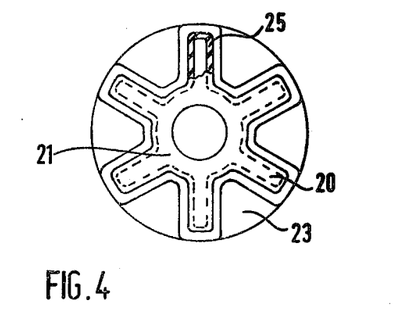
FIG. 4 is an end view of the male portion of the spider unit shown in FIG. 2.
Figure 5:
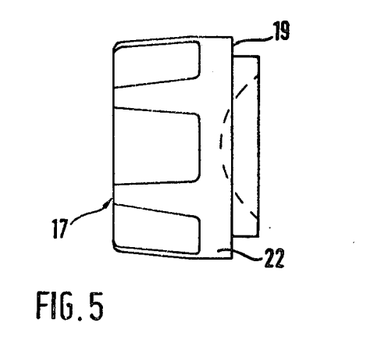
FIG. 5 is a side view of the spider unit portion shown in FIG. 4.
Figure 6:
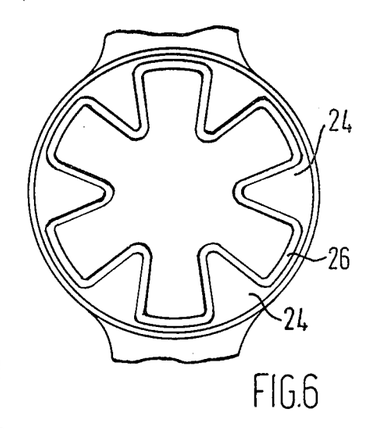
FIG. 6 is an end view of the female portion of the unit shown in FIG. 2.

Of the two tubular metal shafts 11, 12, one shaft 12, is of smaller diameter than the other shaft 11, and as seen by reference to FIG. 2 the smaller diameter shaft 12 extends within the outer metal shaft 11 almost as far as the universal joint 10 to which the outer shaft is welded.

A pair of axially spaced rubber sleeves 14, 15 are located between the inner and outer metal shafts and the rubber material is bonded to the inner sleeve. Additionally the rubber material is under radial compression to give the required torsional stiffness to the sleeves and restrain them from slipping movement relative to either of the shafts.

Initial application of torque between the universal joints 10 is transmitted solely via the rubber sleeves 14, 15, but when a predetermined degree of torsional deflection is exceeded torque is additionally transmitted in parallel with the sleeves by means of a buffer unit 16 which will now be described in more detail.

The buffer unit (see FIGS. 3 to 7) comprises a male spider 17 and a female spider 18, the female spider unit being formed integrally with a universal joint 10 during the forging operation to shape the universal joint.

The male spider 17 is formed at one end with an annular groove 19 in which an end of the shaft 12 is located and welded in position. The male spider is also formed with six arms 20 extending radially outwards from a central hub portion 21, and axially from an annular base portion 22. The arms 20 extend from the base 22 in a direction opposite to the direction which the inner shaft 12 extends from the spider in the final assembly, and the six arms define therebetween six spaces 23 in which are located the abutment portions 24 of the female spider unit 18. The surfaces of the arms 20 are covered with a rubber layer 25 so as to eliminate the shock load effect which would otherwise occur if the metal arms 20 abutted directly with the metal abutments 24 of the female spider unit 18. The six abutment portions 24 of the female spider unit are formed integrally with the universal joint 10, the abutment portions being interconnected by circumferentially extending peripheral web portions 26 to strengthen the female spider unit assembly.

Figure 7:
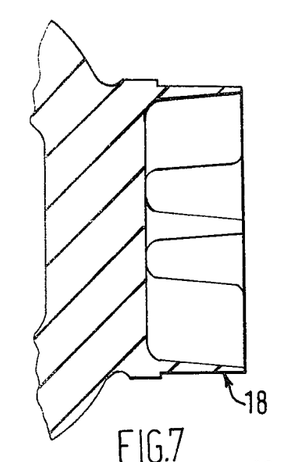
FIG. 7 is a side view of the spider unit portion shown in FIG. 6.
Figure 8:
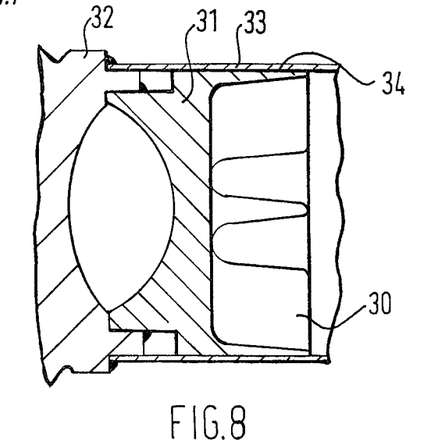
FIG. 8 is a view corresponding to that of FIG. 7 of an alternative female spider portion.

In a modified female spider unit illustrated in FIG. 8, the abutment portions for contact by the arms of a male spider portion are constructed substantially of similar shape to those of FIG. 7. However, instead of the abutment portions being integral with the universal joint, the abutment portions are formed on a separate spider unit 31 which is intended to be welded to the universal joint 32. An outer shaft 33 is welded to the universal joint 32 in substantially the same manner as the shaft 11 is welded to universal joint 10 in the embodiment illustrated in FIG. 2, and the female spider portion 30 has a smooth cylindrical outer surface 34 which fits closely within the outer tube 33.

Figure 9:
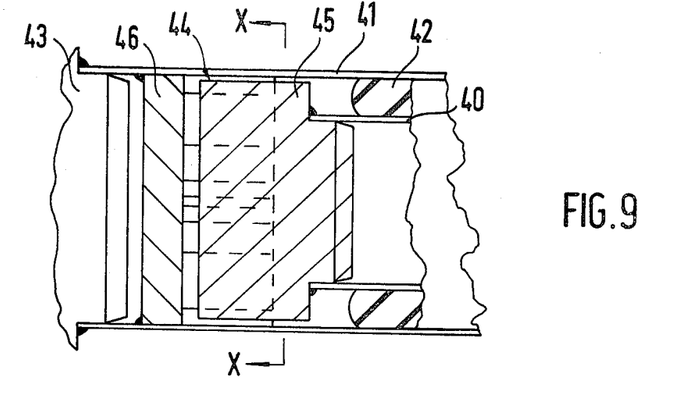
FIG. 9 is a similar view to that of FIG. 2 of a transmission coupling incorporating an alternative design of buffer unit.
Figure 10:
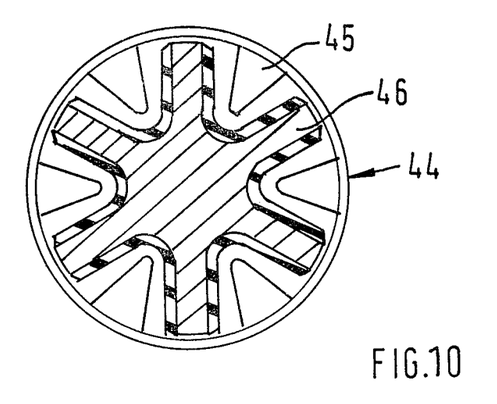
FIG. 10 is a section on the line X—X of FIG. 9.

In a further embodiment illustrated in FIGS. 9 and 10 a transmission coupling comprises inner and outer metal shafts 40,41 interconnected by annular sleeves 42 substantially similar to sleeves 14,15 illustrated in FIG. 2. The outer tube 41 is welded to a universal joint 43, and a buffer unit 44 is provided between the inner and outer shafts 40,41 to transmit torque therebetween when a predetermined degree of torsional deflection has been accommodated by the sleeves 42. The buffer unit comprising a female portion 45 which is welded to the inner tube 40 and a male portion 46 which is welded to the outer shaft 41. In contrast to the constructions of the preceding two embodiments, it will be noted that in this construction the buffer unit is carried solely by the inner and outer shafts 40,41, and is independent of the universal joint 43.

Figure 11:
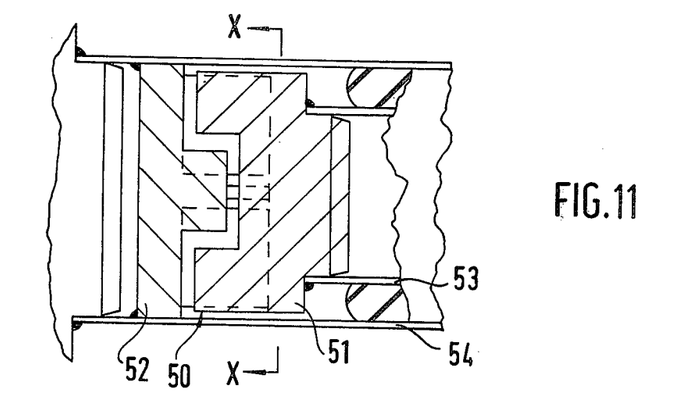
FIG. 11 is a similar view to that of FIG. 2 showing yet another transmission coupling in accordance with the present invention.
Figure 12:
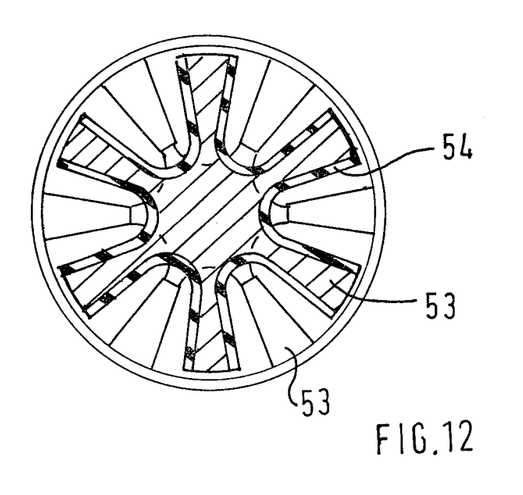
FIG. 12 is a section on the line X—X of FIG. 11.
Figure 13:
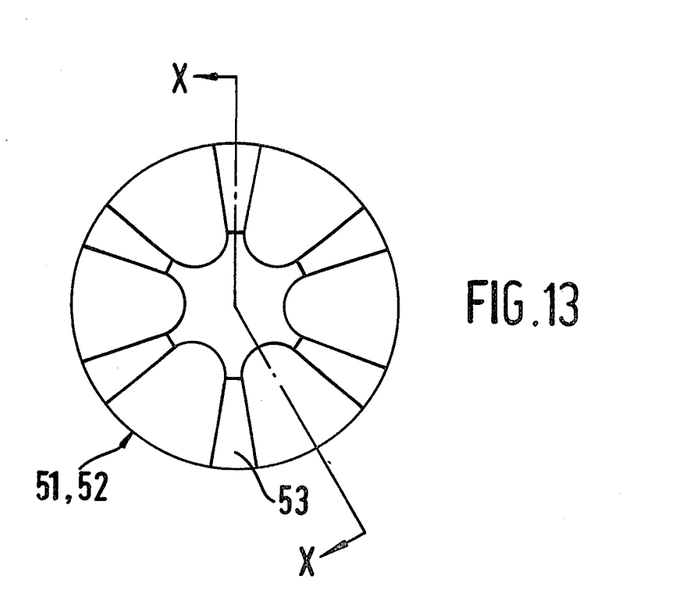
FIG. 13 is an end view of one portion of the buffer unit shown in FIGS. 11 and 12.
Figure 14:
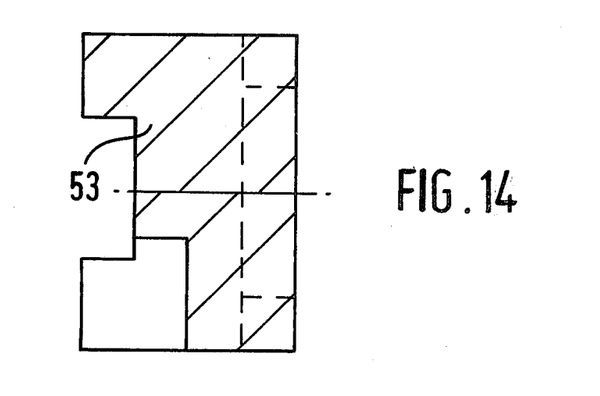
FIG. 14 is a section on the line X—X of FIG. 13.

In yet a further embodiment of the invention, illustrated with reference to FIGS. 11 and 12, a transmission coupling assembly is constructed substantially as described in respect of the embodiment shown in FIGS. 9 and 10 except that the buffer unit is of an alternative design. In this construction the buffer unit 50 comprises spider unit portions 51,52 secured respectively to inner and outer shafts 53,54. Each buffer portion 51,52 is formed with six abutment members, and the abutment members 53 on each portion are of substantially identical shape, the overall arrangement being substantially similar to that of a dog clutch. To avoid shock loads which might otherwise be caused if there were direct metal-to-metal contact of the abutment members 53 of the portions 51 and 52, the abutment members 53 of the portion 51 are provided with thin rubber layers 54. The construction of each portion 51,52 in respect of the shape of the abutment members is shown in detail by FIGS. 13 and 14. By the use of abutment members 53 of substantially similar shape and size on each portion 51,52 there is a matching in strength of the two parts.

While the invention has been specifically described above in relation to use of the resilient coupling as a cardan shaft, the various constructions of the shaft may be utilized in a vehicle suspension where the coupling is required to transmit torque through only relatively small angular movements and not to be subject to continuous rotation in the manner of a cardan shaft. The coupling may be used to isolate a vehicle body from noise and vibration generated at a vehicle wheel, and may also serve to limit torsional deflection under braking and acceleration conditions.

As well as providing a compact construction, the present invention also enables ready protection of the buffer unit from weathering and road dirt. In addition there is avoided any problem of noise generation as may occur by virtue of the induced air movement which would arise by the use of a buffer unit mounted exteriorly of the sleeve coupling.

Having now described my invention what I claim is:

1. A resilient coupling for transmitting torque between drive and driven shafts comprises an inner shaft nested concentrically within an outer shaft, a resilient sleeve unit of elastomeric material positioned between the shafts for resilient transmission of torque loads between the shafts up to a predetermined value and a resilient buffer unit mounted within the outer shaft for resilient transmission of torque loads between the shafts in excess of the predetermined value, the buffer unit comprising male and female spider units, each spider unit having a plurality of axially extending arms radially spaced from the normal axis of rotation of the coupling with the arms of one spider unit being intercalated with the arms of the other spider unit, respective web portions interconnecting the arms of each spider unit over at least part of the axial length thereof and a respective resilient element of elastomeric material provided between successive arms of the spider units for resilient transmission of torque loads in excess of the predetermined value.

2. A coupling according to claim 1 wherein the peripheral web portions interconnect the arms of the associated spider unit over the entire axial length thereof.

3. A coupling according to claim 1 wherein the female spider unit comprises a tubular member having a plurality of axially and radially inwardly extending arms spaced circumferentially around the inner surface of said member which defines said peripheral web portion.

4. A coupling according to claim 3 wherein the male spider unit comprises an elongate member having a plurality of axially and radially outwardly directed arms spaced circumferentially around the outer surface of said member which defines said peripheral web portion.

5. A resilient coupling according to claim 1 wherein one of said spider units extends from said inner shaft and the other of said spider units is secured to said outer shaft.

6. A resilient coupling according to claim 1 wherein one of said spider units extends from said inner shaft and the outer shaft has secured thereto part of a universal joint from which the other of said spider units extends.

7. A coupling according to claim 6 wherein said other spider unit is integral with said part of said univeral joint.

8. A coupling according to claim 1 wherein said arms define load transmitting surfaces which lie in planes extending in a direction substantially parallel to the axis of rotation of the coupling and said resilient elements are secured to load transmitting surfaces of at least one of said spider units.

9. A coupling according to claim 1 wherein said buffer unit is mounted adjacent the free end of said inner shaft axially inwardly of said sleeve unit.

* * * * *